May 5, 1959  R. L. STAADT  2,885,049
HYDRAULIC FLUID PRESSURE OPERATED DEVICE FOR CLUTCHES
Filed Nov. 26, 1957  3 Sheets-Sheet 2
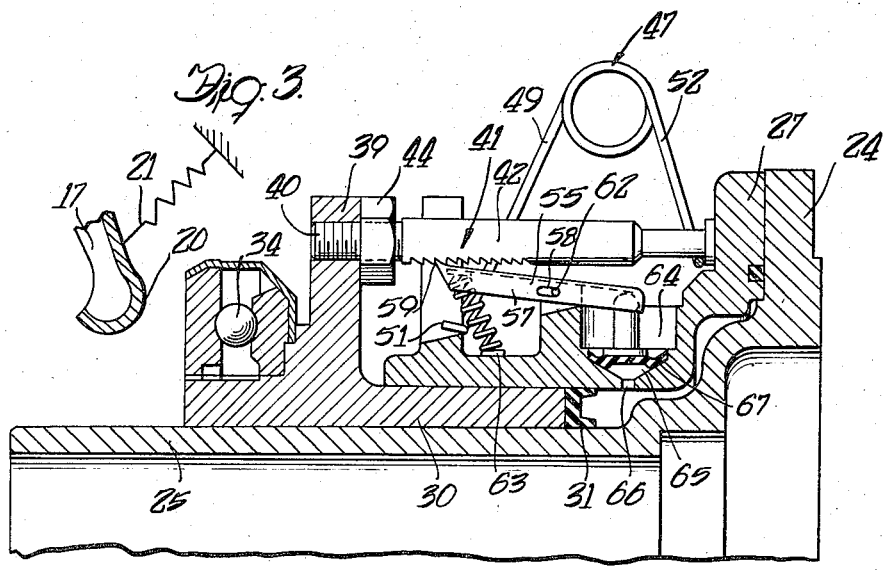
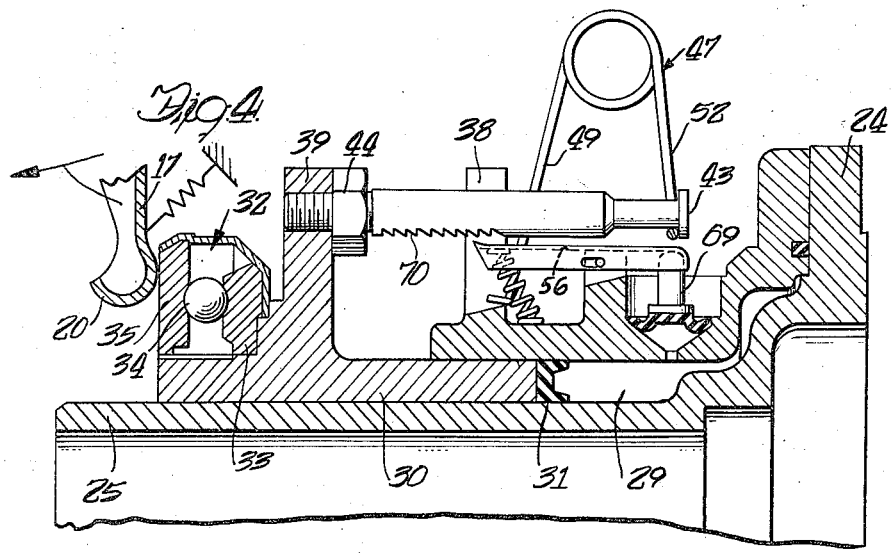
INVENTOR
Richard L. Staadt May 5, 1959  R. L. STAADT  2,885,049
HYDRAULIC FLUID PRESSURE OPERATED DEVICE FOR CLUTCHES
Filed Nov. 26, 1957  3 Sheets-Sheet 3
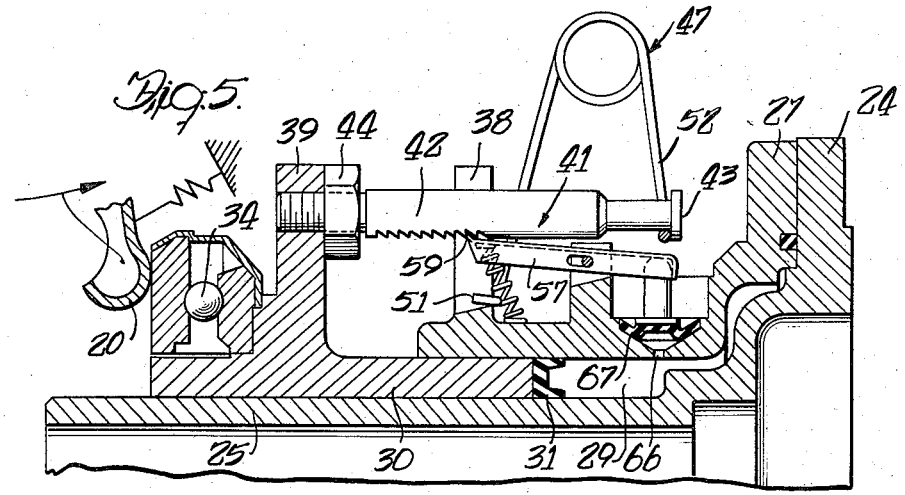
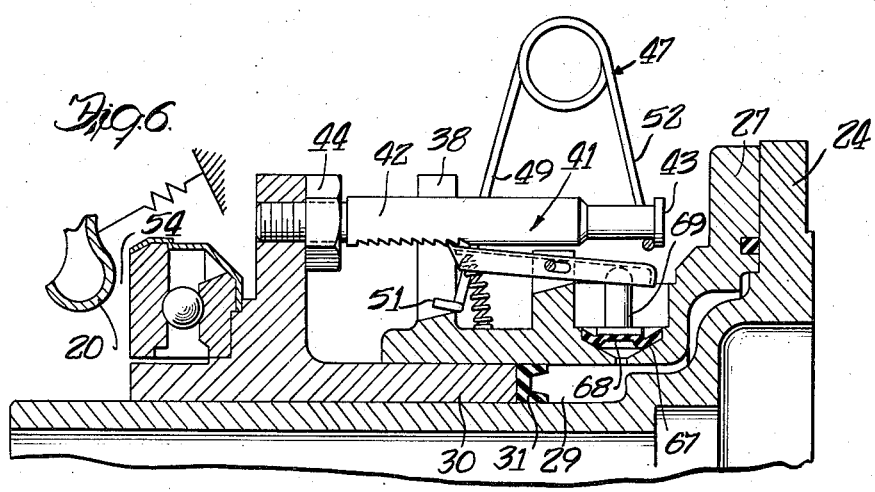
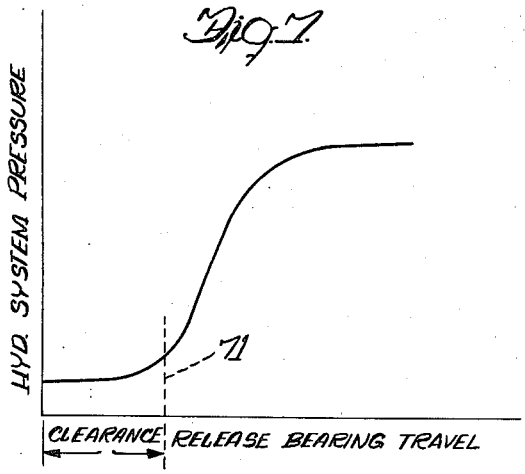
INVENTOR
Richard L. Staadt
Paul O. Pippel
Atty United States Patent Office 2,885,049
Patented May 5, 1959

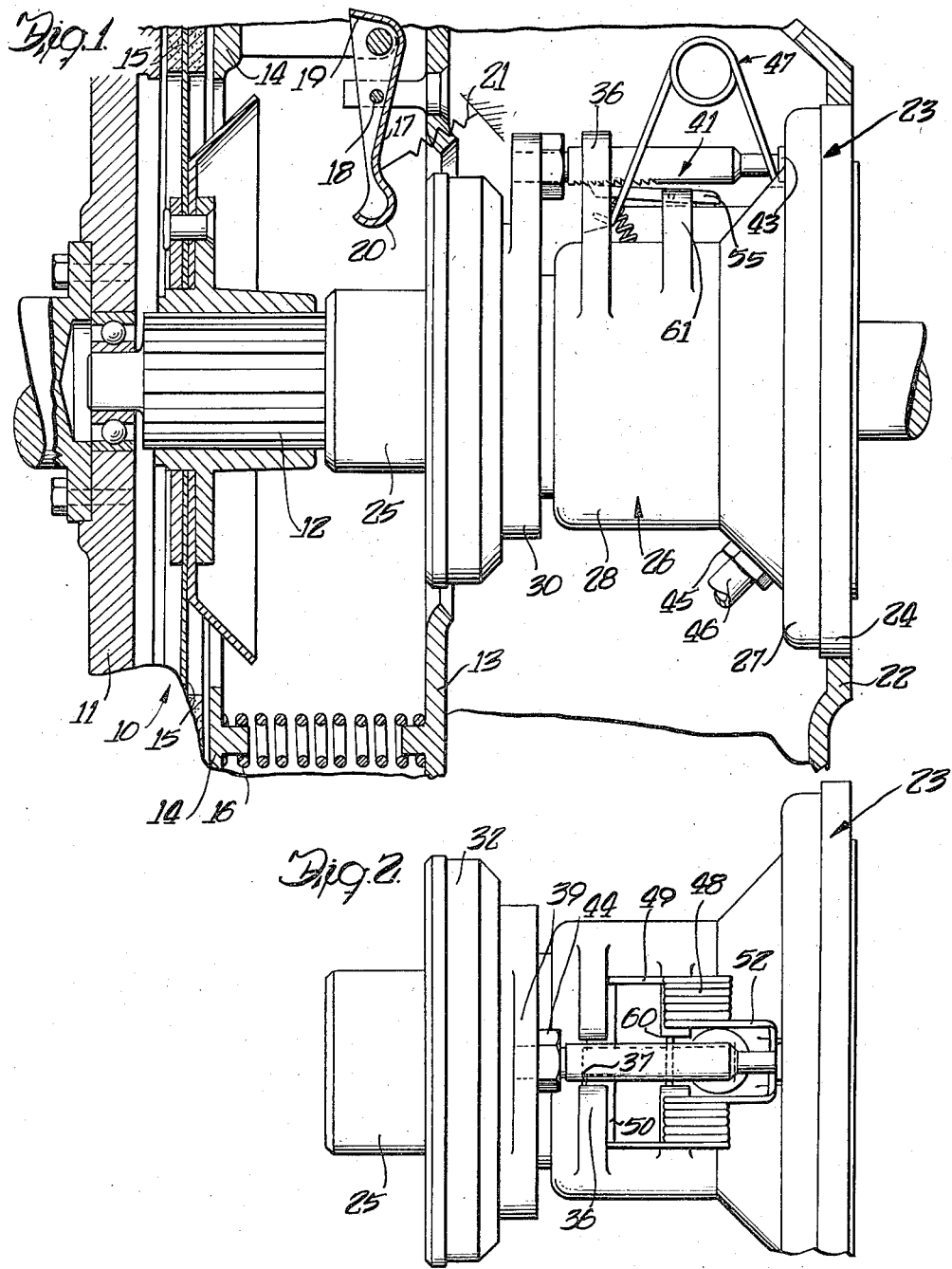

2,885,049

HYDRAULIC FLUID PRESSURE OPERATED DEVICE FOR CLUTCHES

Richard L. Staadt, Fort Wayne, Ind., assignor to International Harvester Company, Chicago, Ill., a corporation of New Jersey Application November 26, 1957, Serial No. 699,007

10 Claims. (Cl. 192—91)

This invention relates to hydraulic fluid pressure operated devices for releasing the drive connection between the driving and driven parts of friction-type disk clutch assemblies and more particularly to a new and improved fluid pressure operated clutch actuating device which is automatically self-adjusting to compensate for wear of the frictionally engaged driving and driven components of the clutch assembly.

Hydraulic fluid pressure operated friction disk clutches to which the present invention relates generally include a plurality of drive and driven friction disk elements which are pressed into engagement with each other by clutch engaging springs for completing the power transmission through the clutch. The clutch release means usually comprises a plurality of circumferentially spaced radially extending levers which are pivotally mounted on a rotating part of the clutch and are constructed and arranged in such a manner that when the inner terminal ends of the levers are moved axially in a particular direction to rock the levers, the drive and driven elements are separated with respect to each other against the resilient action of the clutch-engaging springs for releasing the drive through the clutch. One form of power operating mechanism for relatively separating the drive and driven elements of the clutch includes a hydraulic fluid pressure-receiving cylinder and an axially movable power operator actuated by fluid pressure in the cylinder which carries a thrust transmitting bearing unit adapted to engage the inner ends of the clutch release levers during axial movement of the power operator in a particular direction. The power operator generally is non-rotatable with respect to the clutch release levers and therefore when it is in a position corresponding to the clutch engaged position it is desirable that a predetermined axial spacing or clearance be maintained between the inner terminal ends of the clutch release levers and the thrust transmitting bearing unit. The axial clearance or spacing is provided to limit to a minimum the frictional drag imposed upon the clutch release levers during clutch engaged phase of operate of the clutch mechanism since the power operator is restrained from relative rotational movement with respect to the clutch release levers. An axial clearance is also desirable to prevent unnecessary wear of the thrust transmitting bearing unit, undue wear of the contacting area of the clutch release levers and the thrust transmitting bearing unit, and to obviate the possibility of the thrust bearing unit exerting enough pressure on the clutch release levers to partially disengage the clutch and cause relative slipping of the driving and driven clutch elements with a consequent unnecessary accelerated facing wear. Thus only when the clutch is being released as when the thrust transmitting bearing unit engages the terminal inner ends of the clutch release levers is there a frictional drag imposed upon the levers. This frictional drag is reduced to a minimum by the use of a bearing unit usually of the anti-friction ball or roller type. As the friction facing material provided on the drive and/or driven elements of the clutch wear and become thinner when measured in an axial direction, the inner terminal ends of the clutch release levers move axially toward the thrust transmitting bearing unit carried by the power operating operator. It is therefore an important object of the present invention to provide adjusting means for automatically positioning the bearing unit axially with respect to the inner ends of the clutch release levers to insure complete engagement of the drive and driven elements of the clutch assembly and to maintain a predetermined axial spacing of clearance between the inner ends of the clutch release levers and the thrust transmitting bearing unit.

Another object of the present invention is the incorporation into a hydraulic clutch actuator of an automatic wear take-up means which functions during the clutch engaging phase of the operation of the clutch and is operable to automatically adjust the clutch assembly for wear by axially positioning the thrust transmitting bearing unit in conformity with the position assumed by the inner ends of the clutch release levers when the clutch is in its fully engaged position.

Still another object of the invention is to automatically position the power operator of a hydraulic fluid pressure clutch actuator with respect to the clutch release means to compensate for the positional change of the clutch release means resulting from wear of the friction elements of the clutch assembly.

The foregoing and other important objects and desirable features inherent in and encompassed by the invention, together with many of the purposes and uses thereof will become readily apparent from a reading of the ensuing description in connection with the annexed drawings in which:

Figure 1 is a side elevational view of the hydraulic fluid pressure operated device in its fully retracted position and the wear take-up means in one operational position as when the device is first installed in a clutch mechanism;

Figure 2 is a plan view of the fluid pressure operated device shown in Figure 1;

Figure 3 is a vertical sectional view of the upper portion of the fluid pressure operated device showing the various parts thereof as well as the automatic wear take-up means in the same position as shown in Figure 1;

Figure 4 is a view similar to Figure 3 showing the thrust transmitting unit engaging the inner terminal ends of the clutch release levers;

Figure 5 is a vertical sectional view of the fluid pressure operated device at a point where the thrust transmitting unit is just moving out of engagement with the inner terminal ends of the clutch release levers and the power operator is moving to the right;

Figure 6 is a view similar to Figure 5 showing the power operator in its fully retracted position corresponding to the clutch engaged position, and Figure 7 is a curve showing hydraulic system pressure plotted versus the thrust transmitting bearing unit travel during the clutch releasing and engaging operation. The invention is shown incorporated in a motor vehicle clutch and control system friction clutch assembly 10, which specifically forms no part of the present invention and is of a well known type currently used commercially, includes a drive element or fly-wheel 11 in which one end of a driven or transmission input shaft 12 is journalled, a cover plate 13 partially shown is mounted on the fly wheel 11. Disposed between the fly wheel 11 and the cover 13 is an axially shiftable pressure plate 14. A friction driven disk or element 15 is splined on the driven shaft 12 and is clamped between the pressure plate 14 and the fly wheel 11 to establish a drive connection between the fly wheel 11 and the driven shaft 12 by means of a plurality of circumferentially spaced clutch engaging springs 16, one of which is shown somewhat diagrammatically in Figure 1. The springs 16 bear against the cover plate 13 and the pressure plate 14.

In order to disrupt the drive connection between the fly wheel 11 and the driven shaft 12, pressure plate 14 is moved away from flywheel 11 against the biasing action of clutch engaging springs 16, releasing frictional engagement of driven disk plate 15 with flywheel 11 and pressure plate 14. Such movement of the clutch pressure plate 14 axially away from the fly wheel 14 is accomplished by rocking of a plurality of circumferentially spaced clutch release levers 17 (one of such levers being shown in Figure 1). Each lever 17 is rockably supported by means of a pin 18 which is fastened to the cover plate 13. A radially outermost end portion 19 of each lever 17 is pivotally connected to the pressure plate 14 whereby when the radially innermost end portions 20 of the levers 17 receive an axial thrust to the left as viewed in Figure 1 to rock the levers 17 about pins 18, the pressure plate 14 is caused to move axially to the right away from the friction disk 15 against the biasing action of the clutch engaging springs 16 to thereby brake the drive connection between the flywheel 11 and the driven shaft 12. When the levers 17 are relieved of such axially thrust, the clutch springs 16 shift the pressure plate 14 axially to the left as viewed in Figure 1 to clamp the driven element 15 to the flywheel 11 to re-establish the frictional drive engagement therebetween. Spring means 21 shown diagrammatically also operatively engage the clutch release levers 17 tending to pivot the release levers 17 in a direction whereby the innermost terminal ends 20 thereof move axially toward the right as viewed in Figure 1.

As in conventional power trains utilized in motor vehicles the driven shaft which is in reality the input shaft to the change speed transmission, not shown, extends through the bell housing 22 to which the change gear mechanism housing (not shown) is attached. A bearing cover 23 is suitably fastened to the wall 22 and encircles the shaft 12. The bearing cover 23 includes a radially extending flange portion 24 integrally formed with an axially extending sleeve-like section 25 through which the driven shaft 12 extends.

The hydraulic fluid pressure operated actuating device for rocking the clutch levers 17 about the pins 18 to release the driven element from frictional drive engagement with the fly wheel 11 and pressure plate 14 includes the front bearing cover 23 of the change speed gear mechanism. The device also includes a cylindrical member 26 arranged concentrically with respect to the bearing cover 23. The cylindrical member 26 is formed with a radially extending flange 27 which abuts the radially extending flange 24 of the bearing cover 23. The cylindrical member 26 is fastened to the bearing cover 23 by suitable means such as cap screws, not shown, which extend through the abutting flanges 24 and 27. The flange 27 is provided with an annular groove in which a sealing ring is enclosed for sealing the abutting surfaces of the flanges 24 and 27. Integrally formed with and extending axially away from the flange 27 is a tubular section 28 which is arranged concentrically with the sleeve-like section 25, but is radially spaced outwardly therefrom to provide a fluid pressure receiving chamber 29. From the foregoing it will be appreciated that the fluid pressure receiving chamber 29 is closed at one end in a fluid type manner and it has its opposite end open. A sleeve-like piston or power operator 30 is mounted on the sleeve-like section 25 and is adapted to slide axially and have one end thereof slidably engaging the surfaces of the sections 28 and 25 partially defining the fluid-receiving chamber 29. A ring of resilient material 31 is provided on the end of the piston sleeve 30 movable within the cylinder or chamber 29 to prevent fluid leakage between the surface of the piston sleeve and the engaged surfaces of the tubular section 28 and the sleeve-like section 25.

An anti-friction thrust-transmitting bearing unit designated generally by numeral 32 includes an inner race 33 which is press-fitted onto the end of the piston adjacent the clutch release levers 17. The bearing unit 32 includes a plurality of balls 34 and an outer race 35 which is adapted to engage the innermost terminal end portions 20 of the clutch release levers 17 during release of drive connection through the clutch mechanism and rotates with the clutch release levers 17 relative to the inner bearing race 33. The piston is restrained from rotating by means of inner engaging parts which are carried by the tubular section 28 of member 26 and the piston 30 which serve to keep the piston 30 and member 36 together. A radially extending guide ear 36 integrally formed adjacent the end of the tubular section 28 opposite the flange 27 is provided with a radially extending slot 37 having its outermost end open and the side walls thereof being defined by parallel surfaces 38. Extending radially from and being integrally formed with the piston 30 is a tab 39. The tab 39 is provided with a threaded aperture therethrough for receiving the threaded end 40 of a guide pin 41. The guide pin 41 has an elongated cylindrical section 42, the diameter of which is slightly less than the spacing between the vertical surfaces 38 and defining slot 37. The longitudinal axis of the guide pin 41 is spaced from and is parallel to the rotational axis of the driven shaft 12 and the guide pin is adapted to extend through the slot 37 as shown in Figure 1. It will be appreciated that the piston 30 is guided while moving axially with respect to the member 26 and also is prevented from rotating with respect thereto by means of the cooperating surfaces of the guide pin 41 and the slot 37. The end 43 of the guide pin 41 opposite the threaded end 40 is in the form of an enlarged abutment head adapted to abut the flange 27 to positively limit and establish the maximum retracted position of the piston 30 with respect to the member 26. The maximum retracted position of the piston 30 may be varied slightly by first loosening a lock nut 44, threaded on the end 40 of the guide pin 41 and normally abutting the end face of the tab 39, sufficiently to permit rotation of the guide pin with respect to the tab. Thus to move the piston 30 to the right axially as viewed in Figure 3 guide pin 41 is rotated in the direction to thread the same into the tab 39 to shorten the distance between the enlarged abutment head 43 and the end face of the tab 39. After the desired adjustment is obtained the lock nut 44 is tightened against the tab 39 to maintain the adjustment of the guide pin 41.

Hydraulic fluid under pressure is introduced to the chamber cylinder through a pipe fitting 45 threaded into an opening in the member 26. Fluid pressure is imparted to the hydraulic fluid by means of a remotely operated manually operable master cylinder assembly, not shown. A pipe 46 partially shown in Figure 1 has one end connected to the fitting 45 and its opposite end connected to the end of the master cylinder assembly to establish fluid communication between the master cylinder assembly and the fluid pressure receiving chamber 29. The master cylinder assembly may be of any conventional type and generally includes a pivotally supported clutch pedal, not shown, which when rocked in a particular direction by the advocation of force by the operator's foot supplies the chamber 29 with fluid under pressure. When the force of the foot is removed from the clutch pedal, spring means, not shown, associated with the clutch pedal return the clutch pedal to its retracted position which position corresponds to the clutch engaged position. The force for returning the clutch pedal to its engaged position is not only derived from the spring means associated with the clutch pedal, but also from the pressure of the fluid being emitted from the chamber 29 acting upon the master cylinder piston, not shown, as the clutch engaging springs 16 acting through the clutch levers 17, and the spring means 21 acting upon the clutch release levers 17, move the piston 30 to the right as viewed in Figure 5. It will be appreciated that the spring 16 and the spring means 21 are only capable of exerting an axial force upon the piston 30 during the relative movement of the driving and driven elements of the clutch assembly 10, their released position to their fully engaged position, or in other words, only during the time when the terminal end 20 of the clutch release levers 17 are in engagement with the outer bearing race 35 of the thrust transmitting bearing unit 32. Axial movement of the piston 30 from the terminal end 20 of the clutch release levers 17 when the levers are in their clutch engaged positions whereby the outer bearing race 35 is moved out of engagement with the terminal ends 20 of the clutch release levers 17 is accomplished by a spring element 47. The spring element 47 is formed from a single piece of material and includes a pair of helically wound sections 48. The end portions 49 are in the form of legs extending from the helically wound sections 48 and terminal ends of such legs are provided with offset projections which engage the ear 36 at the bottom of the slot 37. The projections 50 are provided with right angle tips 51 each of which engages a respective surface 38 of the slot 37 to maintain the ends of the legs 49 in abutting engagement with the ear 36. The central section 52 of the spring element 47 is in the form of a U-shaped groove having the ends thereof integrally formed with a respective helically wound section 48. The central section 52 is adapted to brace the guide pin 41 and the bight portion thereof is constructed and arranged to abut the enlarged abutment head 43. From the foregoing it will be appreciated that the spring element 47 biases the piston 30 axially and yieldably urges the enlarged abutment head 43 of the guide pin 41 axially toward the flange 27.

As stated hereinbefore it is desirable to provide an axial spacing or clearance between the terminal ends 20 of the clutch release levers 17 and the outer race 35 of the thrust transmitting bearing unit 32 when the clutch levers are in their positions corresponding to the clutch engaged position of the drive and driven elements in order to limit to a minimum the frictional drag imposed upon the inner ends 20 of release levers 17 during operation of the clutch mechanism since the clutch release levers 17 rotate with the fly wheel 11 while the piston 30 is restrained from rotational movement. Clearance is also desirable to prevent unnecessary wear of the thrust bearing unit 32, undue wear of the contacting area of the clutch release levers 17 and the outer race 35 and to obviate the possibility of the thrust bearing unit 32 exerting enough pressure on the clutch release levers 17 to partially disengage the clutch and cause slipping of the driven disk and unnecessary facing wear. Thus only when the clutch is being released and the outer bearing race 35 engages the terminal ends 20 of the levers 17 is there a frictional drag imposed upon the levers. This frictional drag is reduced to a minimum by the antifriction balls 34. However, while it is desirable and important to provide the aforesaid axial spacing or clearance between the terminal ends 20 of the clutch release levers 17 and the outer race 35 of the thrust-transmitting bearing unit 32, it is equally important and desirable to limit such axial spacing to a predetermined maximum amount since it is important to limit to a minimum the axial travel of the piston 30 during the clutch releasing operation before the outer race 35 of the thrust-transmitting bearing unit 32 engages the terminal ends 20 of the clutch release levers 17 to commence separation of the drive and driven elements of the clutch assembly. Shown in Figure 6 is an ideal axial spacing or clearance 54 between the inner terminal ends 20 of the clutch release levers 17 and the outer bearing race 35 which is great enough to insure complete disengagement of the thrust-transmitting bearing unit when in its retracted position, but which is small enough so that the clutch pedal need be depressed or rocked only a short distance before the bearing unit 32 engages the clutch release levers 17. As stated hereinbefore the present invention contemplates means for automatically maintaining the predetermined clearance 54 throughout the operating life of the clutch assembly 10.

As the clutch facings wear and become thinner when measured in an axial direction, the innermost terminal ends 20 of the clutch release levers 17 move to the right as viewed in Figure 1, consequently to insure complete engagement of the drive and driven elements of the clutch assembly 10 by maintaining a predetermined axial spacing of clearance 54 between the inner ends 20 of the clutch release levers 17 and the outer race 35 of the thrust-transmitting bearing unit 32, it is necessary to move the piston 30 axially to the right into the cylinder or chamber 29. This axial adjustment of the piston 30 with respect to the clutch release levers 17 is made automatically by a pressure responsive device which includes a pawl 55. The pawl 55 is made of sheet metal or the like and is substantially U-shaped in vertical cross section to provide a top wall 56 and a pair of spaced, side walls 57. One end of the pawl 55 is provided with an end wall and the opposite end is formed to provide a single tooth 59. The side walls 57 are provided with transversely aligned elongated slots 58 therethrough which extend longitudinally with respect to the longitudinal axis of the pawl 55. The pawl 55 extends through a slot 60 which is in longitudinal alignment with the slot 37 and is provided in a radially extending ear 61 integrally formed with the tubular section 28 and axially spaced intermediate the ear 36 and the flange 27. Extending transversely across the slot 60 and having its ends suitably secured to the ear 61 is a pin 62. The pin 62 extends through the registering slots 58 and serves as means for supporting the pawl 55 for pivotal as well as axial movement with respect to the tubular section 28 of the member 26. The longitudinal length of the transversely aligned elongated slots 58 is equal to the ideal axial spacing or clearance 54 between the inner terminal ends 20 of the clutch release levers 17 and the thrust-transmitting bearing unit 32.

One end of a helically wound spring 63 abuts and is suitably fixed to the tubular section 28 of the member 26 intermediate the ears 36 and 61. The spring 63 extends upwardly and axially to the left, as viewed in Figure 1, and the opposite end thereof is disposed between the side walls 57 and abuts the underside of the top wall 56 adjacent the tooth 59 of the pawl 55. It will be appreciated that the spring 63 exerts a yieldable force on the pawl 55 tending to continually pivot the pawl in a clockwise direction, as viewed in Figure 1, about pin 62 and to move the pawl axially to the left whereby the pin 62 is disposed in one end of the slots 58. Extending radially through the tubular section 28 of the member 26 between the flange 27 and the ear 61 is a circular bore 64, the radially innermost end of which is counterbored as indicated by numeral 65. Leading from the counterbore 65 to the interior of the fluid pressure-receiving chamber 29 is a relatively short passage 66. Seated within the counterbore 65 at the innermost end of the bore 64 and suitably sealed to the tubular section 28 is a diaphragm 67 made of flexible material such as rubber or the like. The diaphragm 67 is capable of flexing between a normal clutch engaged collapsed position wherein the central portion 68 of the diaphragm is in its radially innermost position and an expanded position, shown in Figure 4, wherein the central portion 68 is radially spaced outwardly from the position assumed thereby when the diaphragm 67 is in its collapsed condition. A radially extending pin 69 has one end bearing on the central portion 68 of the diaphragm 67 and is movable radially therewith. The opposite end of the pin 69 has a semi-spherical form adapted to abut the underside of the top wall 56 of the pawl 55 and is disposed between the side walls 57 adjacent the end wall.

A portion of the length of a cylindrical section 42 extending from the threaded end 40 is provided with a series of ratchet teeth 70 which are adapted to be engaged by the single tooth 59 of the pawl 55. It will be noted that the ratchet teeth 70 are formed and disposed with respect to the pawl tooth 59 in such a manner that when the tooth 59 is in engagement with the ratchet teeth 70 relative movement of the guide pin 41 to the right, as viewed in Figure 1, with respect to the pawl 55 is prevented while movement of the pin 41 to the left with respect to the pawl 55 is permitted since the single tooth 59 is capable of riding over the ratchet teeth 70. The spring 63 as pointed out hereinbefore continually biases the pawl tooth 59 upwardly and axially to the left, as viewed in Figure 1, into engagement with the ratchet teeth 70.

When the hydraulic fluid pressure operated actuating device is first installed in a motor vehicle the various parts of the clutch assembly 10 and the components of the clutch actuating device are in the position illustrated in Figure 1. In this position the fluid receiving chamber 29 is filled or substantially filled with fluid under atmospheric pressure and the clutch pedal located in the operator's compartment is in its fully raised position. It will be noted that the enlarged abutment head 43 is spring-pressed into engagement with the radial flange 27 by the spring 47. It will also be noted that the diaphragm 67 is in its collapsed state and the tooth 59 is spring-pressed into engagement with the ratchet teeth 70 by means of the spring 63. In operation, assuming that the clutch assembly and clutch actuating device are in the clutch engaged position illustrated in Figure 1 as when the device is first installed in the clutch assembly, and it is desired to disrupt the transmission of power between the driven flywheel 11 and the input shaft 12 of the change-speed transmission for the first time, fluid under pressure is admitted into the chamber 29 through the pipe 46 by depression of the clutch pedal by the vehicle operator. Pressure of the fluid introduced into the chamber 29 acts upon the piston 30 causing it to slide axially to the left as viewed in Figure 1 into engagement with the inner terminal ends 20 of the levers 17. Axial movement of the piston 30 from the position shown in Figure 1 to the position shown in Figure 4 where the outer bearing race 35 of the thrust transmitting bearing unit 32 engages the inner terminal ends 20 of the levers 17 is yieldably resisted by the spring 47 which has a very light biasing action as compared to the combined biasing action of the clutch engaging springs 16 and the spring means 21 acting directly upon the clutch release fingers 17. Thus, in order to advance the piston 30 axially into engagement with the lever ends 20 it is only necessary to overcome the biasing action of the spring 47 and since the biasing action of spring 47 is comparatively small the maximum pressure of the fluid within the chamber 29 is relatively small and substantially constant during this operational phase of the piston. Because the spring 63 exerts an axial force upon the pawl 55, once the pawl tooth 59 is disengaged from the ratchet teeth 70 the pawl is maintained bodily translated to the left so that the pin 62 is at the right hand ends of the slots 58. Continued movement of the piston 30 axially to the left by further depression of the clutch pedal by the vehicle operator effects rocking of the levers 17 against the resistance of the clutch springs 16 and the spring means 21 to withdraw the pressure plate 14 from frictional engagement with the driven element 15 to thus release the driven element from frictional engagement with the flywheel 11. With the added resistance of the clutch-engaging spring 16 and the spring means 21 acting upon the piston 30 the fluid pressure within the chamber 29 increases rapidly. Inasmuch as the pressure of the fluid present within the chamber 29 also acts upon the diaphragm 67 since one side of the diaphragm is in fluid communication with the chamber, the diaphragm 67 is expanded against the biasing action of the spring 63, as shown in Figure 4, upon completion of the axial movement of the piston 30 from the position shown in Figure 1 to the position shown in Figure 4 and at the commencement of the rapid rise of fluid pressure within the chamber. When the diaphragm 67 is in its expanded position the pawl tooth 59 is rocked out of engagement with the ratchet teeth 70 by compressing the spring 63. The point on the curve shown in Figure 7 where the pawl tooth 59 is moving into or out of engagement with the ratchet teeth 70 is illustrated by the intersection of a vertical broken line 71 and the curve. When the pressure of the fluid within the chamber 29 is relieved as by the operator removing his foot from the clutch pedal, the clutch-engaging springs 16, spring means 21 and the spring 47 all act in unison to return the drive and driven element of the clutch assembly 10 into driving engagement and to effect movement of the piston 30 to the right as viewed in Figure 5. The resilient action of the clutch engaging springs 16 and the spring means 21 continually act upon the piston 30 until the inner ends 20 of the clutch release levers 17 are in their clutch fully engaged positions, which positions are determined by the amount of wear of the clutch facing of the clutch drive and driven elements. The inner ends 20 of the clutch release levers 17 shown in Figure 5 are in the position corresponding to the clutch fully engaged position and the outer bearing race 35 is just moving out of contact therewith. When this occurs the resilient action of the springs 16 and the spring means 21 are no longer acting upon the piston 30 and as a result the pressure of the fluid within the chamber 29 drops but not at the rapid rate at which it dropped during the time that the clutch pedal was released by the vehicle operator and the clutch release levers 17 were still in engagement with the thrust transmitting bearing unit 32. This point on the curve of Figure 7 which corresponds to the line 71 of Figure 7 and the pressure within the chamber 29 acting upon the diaphragm 67 is insufficient to maintain the pawl tooth 59 out of engagement with the ratchet teeth 70. Consequently, the spring 63 rocks the pawl clockwise as viewed in Figure 5 about the pin 62 causing the pawl tooth 59 to engage the ratchet teeth 70. As stated hereinbefore once the pawl tooth 59 engages the ratchet teeth 70 relative movement of the pawl 55 to the left with respect to the pin 41 is prevented. As a result the pawl 55 and the pin 41 of necessity move in unison to the right, as viewed in Figure 5. However, movement to the right in unison of the pin 41 and the pawl 55 is limited by the axial length of the slots 58. In other words once the pawl tooth 59 engages the ratchet teeth 70 when the piston 30 is being acted upon solely by the spring 47 as illustrated in Figure 5, the piston 30 thereafter can only move axially a distance substantially equal to the axial length of the slots 58 to the position shown in Figure 6, where the pin 62 is at the left hand end of the slots 58. It will be appreciated that the pawl 55 serves as a means for limiting the retractive movement of the piston 30 away from the inner ends 20 of the levers 17. As stated hereinbefore the axial length of the aligned slots 58 determines the clearance between the lever ends 20 and the bearing unit 32 since the clearance is substantially equal to the length of the slots and thus to obtain the ideal clearance 54 the slots 58 are made of a length equal to the clearance 54. From the foregoing it will be appreciated that regardless of the positions of the inner ends 20 of the clutch release levers 17 resulting from the condition of the friction facing materials of the drive and driven elements with respect to fixed parts of the clutch actuating device, a predetermined axial clearance between the inner ends 20 of the clutch release levers 17 and the outer bearing race 35 of the thrust transmitting bearing unit 32 is always maintained when the clutch is in its fully engaged position.

When it is desired to disengage the clutch as when the piston 30 is moved axially from the position shown in Figure 6 into engagement with the lever ends 20, as shown in Figure 4, it is only necessary to overcome the biasing action of the spring 47 and since the biasing action of spring 47 is comparatively small the maximum pressure of the fluid within the chamber is relatively small and constant during this operation phase of the piston. The pawl 55 is bodily translated to the left in unison with the pin 41 as the piston 30 moves from the position shown in Figure 6 to the position shown in Figure 4 because of the frictional engagement connection between the pawl tooth 59 and the engaged ratchet tooth 70.

The embodiment of the invention chosen for the purposes of description and illustration herein is that preferred for achieving the objects of the invention and developing the utility thereof in the most desirable manner, due regard being had to existing factors of economy, simplicity of design and construction and the improvements sought to be effected. It will be appreciated therefore that the particular structural and functional aspects emphasized herein are not intended to exclude but rather to suggest such other adaptations and modifications of the invention as fall within the spirit and scope of the invention as defined in the appended claims.

What is claimed is:

1. In a clutch, the combination of release levers advanceable in one direction to release the clutch and retractable in an opposite direction pursuant to reengagement of the clutch, clutch releasing mechanism comprising a fluid pressure receiving cylinder, a piston in said cylinder forcibly advanceable against the release levers to advance the same by admission of fluid pressure in said cylinder and alternately retractable through a first range of movement conterminous with complete retraction of the levers and further retractable to provide clearance between the piston and the levers upon exhausting of fluid pressure from said cylinder, motion limiting means, said piston being relatively retractable with respect to said motion limiting means while the levers are in the first range, said motion limiting means being operable attendant to continued retraction of said piston following complete retraction of the levers to retract in concert with said piston, and means for inhibiting retraction of said motion limiting means and hence said piston upon predetermined concert retraction thereof.

2. In a clutch, the combination of release levers advanceable in one direction to release the clutch and retractable in an opposite direction pursuant to reengagement of the clutch, clutch releasing mechanism comprising a structure forcibly advanceable against the release levers to advance the same and alternately retractable through a first range of movement conterminous with complete retraction of the levers and further retractable to provide clearance between the structure and the levers, ratchet means advanceable and retractable with said structure, a pawl cooperable with said ratchet means and being bodily translative advancively and retractively in the direction of advance and retraction of said ratchet means, means limiting the range of advancive and retractive movement of the pawl, said pawl being engageable with said ratchet means to prevent retraction of said structure with respect to said pawl, means operable responsively to force applied to said structure to advance the same of a magnitude to incur advancement of said levers into said first range of movement to release the pawl from the ratchet means, means for maintaining the pawl translatively advanced during such release of the pawl, and means for reengaging the pawl with the ratchet means pursuant to diminution of the force of said structure to a magnitude that the levers are completely retracted, and means for thereafter retracting said structure away from said levers into such further range a distance correlated with the extent of the advancive and retractive range of bodily translative movement of the pawl.

3. In a clutch, the combination of release levers advanceable in one direction to release the clutch and retractable in an opposite direction pursuant to reengagement of the clutch, clutch releasing mechanism comprising a fluid pressure receiving cylinder, a piston in said cylinder forcibly advanceable against the release levers to advance the same upon admission of fluid pressure in said cylinder and alternately retractable through a first range of movement conterminous with complete retraction of the levers and further retractable to provide clearance between the piston and the levers upon exhausting of fluid pressure from said cylinder, ratchet means advanceable and retractable with said piston, a pawl carried by said cylinder and cooperable with said ratchet means and being bodily translative advancively and retractively in the direction of advance and retraction of said ratchet means, means limiting the range of advancive and retractive movement of the pawl, said pawl being engageable with said ratchet means to prevent retraction of said piston with respect thereto, means operable responsively to fluid pressure in said cylinder of a magnitude to advance the piston to incur advancement of said levers into said first range of movement to release the pawl from the ratchet means, means for maintaining the pawl translatively advanced during such release of the pawl, and means for reengaging the pawl with the ratchet means pursuant to diminution of the pressure of the fluid in said cylinder to a magnitude that the levers are completely retracted, and means for thereafter retracting said piston away from said levers into such further range a distance correlated with the extent of the advancive and retractive range of bodily translative movement of the pawl.

4. In a clutch substantially as set forth in claim 3, in which, said means operable responsively to fluid pressure in said cylinder of a magnitude to advance the piston to incur advancement of said levers into said first range of movement, to release the pawl from the ratchet means includes a flexible diaphragm having one side thereof in fluid communication with the interior of said fluid pressure receiving cylinder and its opposite side operatively engageable with said pawl, said diaphragm being movable from a collapsed position to an expanded position when the magnitude of fluid pressure in said cylinder is capable of advancing the piston to incur advancement of said levers into said first range of movement, said diaphragm when moved to its expanded position from its collapsed position causing said pawl to move out of engagement with said ratchet means.

5. In a friction clutch assembly for releasably connecting a shaft with a drive element including release levers advanceable axially in one direction to release the clutch and retractable axially in an opposite direction pursuant to reengagement of the clutch, clutch releasing mechanism comprising a fluid pressure receiving cylinder concentric with said shaft, a sleevelike piston concentric with said shaft and extending into said cylinder, said piston being forcibly advanceable axially against the release levers to advance the same upon admission of fluid pressure in said cylinder and alternately retractable through a first range of movement conterminous with complete retraction of the levers and further retractable to provide clearance between the piston and the levers upon exhausting of fluid pressure from said cylinder, ratchet means advanceable and retractable axially with said piston, a pawl cooperable with said ratchet means and engageable with said ratchet means to prevent axial retractive movement of said piston with respect thereto, means for mounting said pawl on said cylinder for limited bodily translative axial movement with respect thereto, means operable responsively to fluid pressure in said cylinder of a magnitude to advance the piston axially to incur advancement of said levers axially into said first range of movement to release the pawl from the ratchet means, means for maintaining the pawl translatively advanced axially during such release of the pawl, and means for reengaging the pawl with the ratchet means pursuant to diminution of the pressure of the fluid in said cylinder to a magnitude that the levers are completely retracted, and means for thereafter retracting said piston axially away from said levers into such further range a distance correlated with the extent of the bodily translative axial movement of the pawl with respect to said cylinder.

6. In a friction clutch assembly for releasably drivingly connecting a shaft with a drive element including clutch release means axially movable in a first direction from a first clutch engaged position to a second clutch released position and axially movable in an opposite second direction from said second position to said first position, clutch releasing mechanism comprising a fluid pressure receiving cylinder concentric with said shaft, a sleeve-like piston in said cylinder movable axially in said first direction against said clutch release means to forcibly move the same axially from said first position to said second position upon admission of fluid pressure in said cylinder and alternately movable axially in said second direction through a first range of movement conterminous with said first position of said clutch release means and further axially movable in said second direction to provide clearance between the piston and said clutch release means upon exhausting of fluid pressure from said cylinder, an axially extending pin carried by said piston, said pin having ratchet teeth formed thereon, a pawl cooperable with said ratchet teeth and engageable therewith to prevent axial movement of said piston in said second direction with respect thereto, means for mounting said pawl on said cylinder for pivotal movement and for limited bodily translative axial movement with respect thereto, means operable responsively to fluid pressure in said cylinder of a magnitude to advance the piston axially in said first direction to incur movement of said clutch release means from said first position to said second position thereof to impart pivotal movement to said pawl and release the pawl from the ratchet teeth, spring means operatively engaging said pawl and said cylinder for maintaining the pawl translatively advanced axially during such release of the pawl, said spring means being effective to impart pivotal movement to said pawl and re-engage the pawl with the ratchet teeth pursuant to diminution of the pressure of fluid in said cylinder to a magnitude that the levers are completely retracted and in said first position, and means for thereafter retracting said piston axially away from said levers in said second direction a distance correlated with the extent of the bodily translative axial movement of the pawl with respect to said cylinder.

7. In a friction clutch assembly for releasably drivingly connecting a shaft with a drive element including release levers advanceable axially in one direction to release the clutch and retractable axially in an opposite direction pursuant to re-engagement of the clutch, clutch releasing mechanism comprising, a first stationary sleeve concentric with said shaft, a second sleeve concentric with said shaft having a wall radially spaced from a wall of said first sleeve and having one end thereof fixed to and sealed to one end of said first sleeve, said spaced walls of said sleeves defining a chamber adapted to receive fluid under pressure, a sleeve-like piston concentric with said shaft and extending into said chamber, said piston being forcibly advanceable axially against the release levers to advance the same upon admission of fluid pressure in said cylinder and alternately retractable through a first range of movement conterminous with complete retraction of the levers and further retractable to provide clearance between the piston and the levers upon exhausting of fluid pressure from said cylinder, means for rotatively fixing said piston to said sleeves including an axially extending pin having one end fixed to said piston, said pin having a series of ratchet teeth formed thereon, a pawl cooperable with said ratchet teeth and engageable therewith to prevent axial retractive movement of said piston with respect thereto, said pawl having an elongated slot formed therein midway between its ends, pin means carried by said cylinder extending through said slot whereby said pawl is mounted on said cylinder for pivotal movement and for limited bodily translative axial movement with respect thereto, means operable responsively to fluid pressure in said cylinder of a magnitude to advance the piston axially to incur advancement of said levers axially into said first range of movement to pivot and release the pawl from the ratchet teeth, spring means operatively engaging one end of said pawl and said cylinder for biasing the pawl translatively advanced axially during such release of the pawl, said spring means being effective to pivot and re-engage the pawl with the ratchet teeth pursuant to diminution of the pressure fluid in said cylinder to a magnitude that the levers are completely retracted, and biasing means operatively engaging said piston and said cylinder for thereafter retracting said piston axially away from said levers into such further range a distance correlated with the extent of the bodily translative axial movement of the pawl with respect to said cylinder.

8. In a friction clutch assembly substantially as set forth in claim 7, in which, said means for rotatively fixing said piston to said sleeves further includes an ear extending radially from said second sleeve having a radially extending slot formed therethrough, through which said axially extending pin having ratchet teeth formed thereon extends axially, said axially extending pin having its axis radially spaced and parallel to the rotational axis of said shaft.

9. In a friction clutch assembly substantially as set forth in claim 8, in which, said biasing means for thereafter retracting said piston axially away from said levers into such further range a distance correlated with the extent of the bodily translative axial movement of the pawl with respect to said cylinder includes a spring reacting against said ear and one end of said axially extending pin having ratchet teeth formed thereon.

10. A friction clutch assembly for releasably drivingly connecting a shaft with a drive element including clutch release means axially movable in a first direction from a first clutch engaged position to a second clutch released position and axially movable in an opposite second direction from said second position to said first position, clutch releasing mechanism comprising a fluid pressure receiving cylinder concentric with said shaft, a sleeve-like piston in said cylinder movable axially in said first direction against said clutch release means to forcibly advance the same axially from said first position to said second position upon admission of fluid pressure in said cylinder and alternatively movable axially in said second direction through a first range of movement conterminous with said first position of said clutch release means and further axially movable in said second direction to provide clearance between the piston and said clutch release means upon exhausting of the fluid pressure from said cylinder, an axially extending pin carried by said piston, said pin having ratchet teeth formed thereon, a pawl having an elongated slot formed therein midway between its ends, pin means carried by said cylinder and extending through said slot whereby said pawl is mounted on said cylinder for pivotal movement and for limited bodily translative axial movement with respect thereto, said pawl being pivotal in one direction to cause one end thereof to engage said ratchet teeth and prevent axial movement of said piston in said second direction with respect to said pawl, spring means operatively engaging one end of said pawl and said cylinder for pivoting said pawl in said one direction to effect engagement of said pawl with said ratchet teeth, said spring means being effective to urge said pawl translatively axially in said first direction when said pawl is released from said ratchet teeth, means operable responsively to fluid pressure in said cylinder of a magnitude to advance the cylinder axially in said first direction to incur movement of said clutch release means from said first position to said second position thereof to pivot and disengage the pawl from the ratchet teeth, said means including a flexible diaphragm having one side thereof in fluid communication with the interior of said fluid pressure receiving cylinder and its opposite side provided with a plunger having an end thereof engageable with the end of said pawl opposite the end thereof adapted to engage said ratchet teeth, said diaphragm being movable between a collapsed position and an expanded position, said diaphragm when moved to its expanded position from its collapsed position causing said plunger to effect pivotal movement of said pawl out of engagement with said ratchet teeth, said spring means being effective to pivot said pawl to reengage the pawl with said ratchet means pursuant to diminution of pressure fluid in said cylinder to a magnitude that the levers are completely retracted and said diaphragm is in its collapsed position, and biasing means operatively engaging said piston and said cylinder for thereafter retracting said piston axially from said levers in said second direction a distance correlative with the extent of the bodily translative axial movement of the pawl with respect to said cylinder.

References Cited in the file of this patent

UNITED STATES PATENTS

| | | |
|---|---|---|
| 1,865,105 | Houplain | June 28, 1932 |
| 2,036,004 | Wemp | Mar. 31, 1936 |
| 2,068,579 | Tatter | Jan. 19, 1937 |
| 2,421,869 | Brock | June 10, 1947 |
| 2,593,192 | Rockwell | Apr. 15, 1952 |